3,574,207
PROCESS FOR PREPARING MORPHOLINES
Zdzislaw J. Dudzinski, Clifton, N.J., assignor to Millmaster Onyx Corporation, New York, N.Y.
No Drawing. Original application May 8, 1967, Ser. No. 636,664. Divided and this application Jan. 2, 1970, Ser. No. 412
Int. Cl. C07d 87/26
U.S. Cl. 260—247       6 Claims

ABSTRACT OF THE DISCLOSURE

Tertiary aliphatic amines are prepared by the reaction of 1-chloroalkanes or 1-bromoalkanes with secondary amines in a solventless environment at a temperature at least as high as room temperature, but preferably ranging from about 100° to 160° C., and at a pressure of about ambient for high boiling reactants and about 285 to 350 p.s.i. for low boiling or gaseous reactants. An alkali is preferably also present in the reaction mixture.

---

This is a division of co-pending application Ser. No. 636,664, filed May 8, 1967, the subject matter of which is incorporated herein.

This invention relates to the preparation of aliphatic amines, and it particularly relates to the preparation of tertiary amines by the reaction of either 1-chloroalkanes or 1-bromoalkanes and secondary amines in the absence of a solvent.

In many instances, especially when there is any great excess of the halogenated hydrocarbon, there is a secondary reaction with at least some of the produced tertiary amine to form quaternary ammonium compounds. When the reaction is conducted in a solvent medium, such as heretofore used, these quaternaries, even when present in very small amounts, had a deleterious effect on the reaction, causing emulsification when the free amine was separated from the liquid medium, and causing pyrolysis during distillation.

Furthermore, there is usually present in the reaction mixture a certain amount of alkali which is generally necessary to permit effective extraction. In a solvent medium, the reaction produces a mixture of hydrohalide salts of both the reacting and produced amines. When the alkali is present, both of these hydrohalide salts tend to be liberated by the alkali as free amines. These free amines increase the possibility of further secondary reaction with the produced tertiary amine to form quaternaries. The alkali, additionally, has a tendency to saponify the alkyl halides.

In accordance with the present invention, all the aforementioned disadvantages are obviated by conducting the reaction in the absence of a solvent under predetermined conditions. Furthermore, the tertiary amines are of excellent quality and are produced in more satisfactory yield than was generally the case when using solvents.

The following examples are illustrative of the present invention, without any intent, however, to limit the scope of the invention except as claimed:

In addition to the herein-disclosed chlorides and bromides, other higher alkyl halides, such as decyl, stearyl, etc., may be used. Such homologous halides are used in the identical manner as disclosed in the following examples and react in the same manner to produce the homologous tertiary amines.

EXAMPLE 1

A round bottom, three-necked flask, fitted with an agitator and gas inlet and outlet tubes and with a reflux condenser before the gas outlet tube, was charged with n-dodecyl bromide, morpholine and sodium carbonate in the respective molar proportions of 1:1.2:1.1. The reaction proceeded over a period of about 6 hours at about 120°–130° C. and a pressure of substantially atmospheric pressure. Substantially the theoretical amount of dodecyl morpholine was recovered.

It will be noted that elevated temperatures and pressures are used whereever the amine reactant is a gas or a liquid of low boiling point. The temperature may be as low as room temperature, but is preferably between 100° and 160° C. for most rapid results correlated with satisfactory appearance and yield, although higher temperature can be used if the pressures are made correspondingly higher.

EXAMPLE 2

In the same apparatus as in Example 1, a charge was heated, under agitation, for 12 hours at 150°–155° C. The charge consisted of 4 mols (928 gms.) of n-lauryl chloride, 4.8 mols (420 gms.) of morpholine, and 4.33 mols (460 gms.) of sodium carbonate.

The product was washed at 70° C. and stripped of water at 70°–80° C. under reduced pressure. It was then purified of salts by filtration.

The product, n-lauryl morpholine, was 97.2% pure.

Obviously, many modifications of the present invention are possible in the light of the above teachings. It is, therefore, to be understood that within the scope of the appeneded claims, the invention may be practiced otherwise than as specifically described.

The invention claimed is:

1. A method of making a tertiary amine which comprises reacting a 1-haloalkane with a greater than stoichiometric amount of morpholine in the absence of a solvent at a temperature which is as high as room temperature, and for a period of time which is effective to cause the reaction to go to completion.

2. The method of claim 1 wherein an alkali in a substantially equivalent molecular amount relative to the 1-haloalkane is also present in the reaction mixture.

3. The method of claim 2 wherein the alkali is a member of the group consisting of sodium hydroxide and sodium carbonate.

4. The method of claim 1 wherein the alkane moiety of the 1-haloalkane is a higher alkane having 12 to 18 carbon atoms.

5. The method of claim 1 wherein the 1-haloalkane is 1-chloroalkane.

6. The method of claim 1 wherein the 1-haloalkane is 1-bromoalkane.

No references cited.

NICHOLAS S. RIZZO, Primary Examiner

J. TOVAR, Assistant Examiner